United States Patent [19]

Oishi et al.

[11] 3,718,126
[45] Feb. 27, 1973

[54] IGNITION TIMING REGULATING DEVICE FOR INTERNAL COMBUSTION ENGINES

[75] Inventors: Kazuo Oishi; Tokuhiro Kurebayashi; Noriyoshi Ando; Naboru Yamamoto, all of Kariya; Tadahide Toda; Hidetaka Nohira; Takashi Katoh, all of Shizuoka-ken, all of Japan

[73] Assignees: Toyota Jidosha Kogyo Kabushiki Kaisha, Toyota-shi; Nippondenso Kabushiki Kaisha, Aichi-ken, both of, Japan

[22] Filed: July 14, 1970

[21] Appl. No.: 54,679

[30] Foreign Application Priority Data

July 21, 1969 Japan ..............................44/57566
Oct. 20, 1969 Japan ..............................44/83726

[52] U.S. Cl. ..............................123/117 R, 123/117 A
[51] Int. Cl. ..............................F02p 5/04
[58] Field of Search .....180/82, 103; 123/117, 117.1, 123/102, 97 B

[56] References Cited

UNITED STATES PATENTS

| 3,596,643 | 8/1971 | Schweitzer | 123/117 |
| 3,584,521 | 6/1971 | Tooker | 123/117 |
| 3,603,298 | 9/1971 | Toda | 123/117 |
| 3,581,852 | 6/1971 | Griffin | 123/117 |
| 3,272,191 | 9/1966 | Walker | 123/117.1 |
| 3,327,553 | 6/1967 | Peras | 123/117.1 |
| 3,426,737 | 2/1967 | Walker | 123/117.1 |
| 3,446,195 | 5/1969 | Kane | 123/97 |
| 3,454,871 | 7/1969 | Nolting | 123/117 |
| 3,521,611 | 7/1970 | Finch | 123/117 |
| 2,561,410 | 2/1971 | Soeters | 123/117 |
| 3,568,651 | 3/1971 | Waag | 123/97 |

Primary Examiner—Laurence M. Goodridge
Assistant Examiner—Ronald B. Cox
Attorney—Cushman, Darby & Cushman

[57] ABSTRACT

An ignition timing regulating device for internal combustion engines comprising a logical operation circuit, which receives discriminating output signals produced by comparing individual electric detection signals representing corresponding variables selected from the engine speed, vehicle speed, engine load and engine temperature condition with respective preset values and also an electric detection signal representing the gear position of the transmission as the inputs, and generates a single output signal, and an ignition timing shifting means to shift the spark timing in accordance with the output signal from the afore-said logical operation circuit.

27 Claims, 10 Drawing Figures

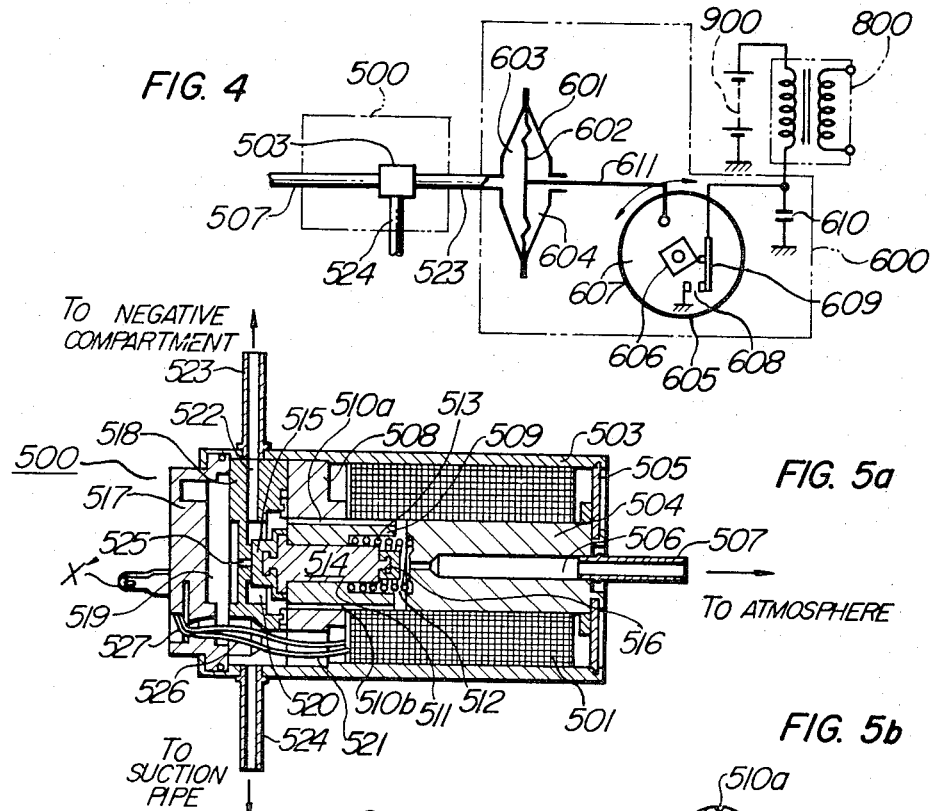
FIG. 4
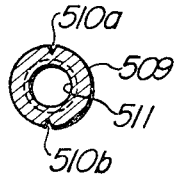
FIG. 5a
FIG. 5b
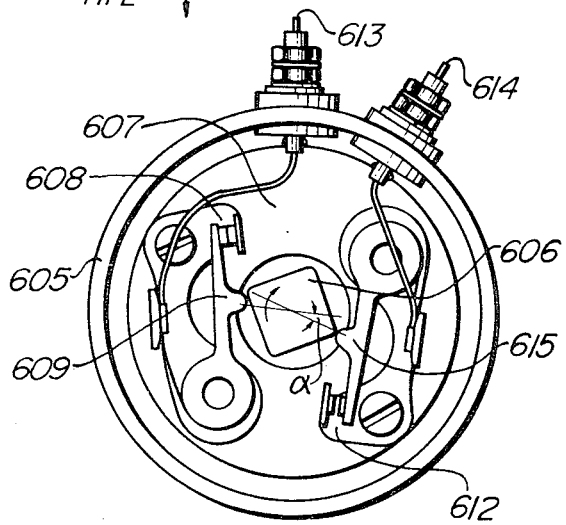
FIG. 6

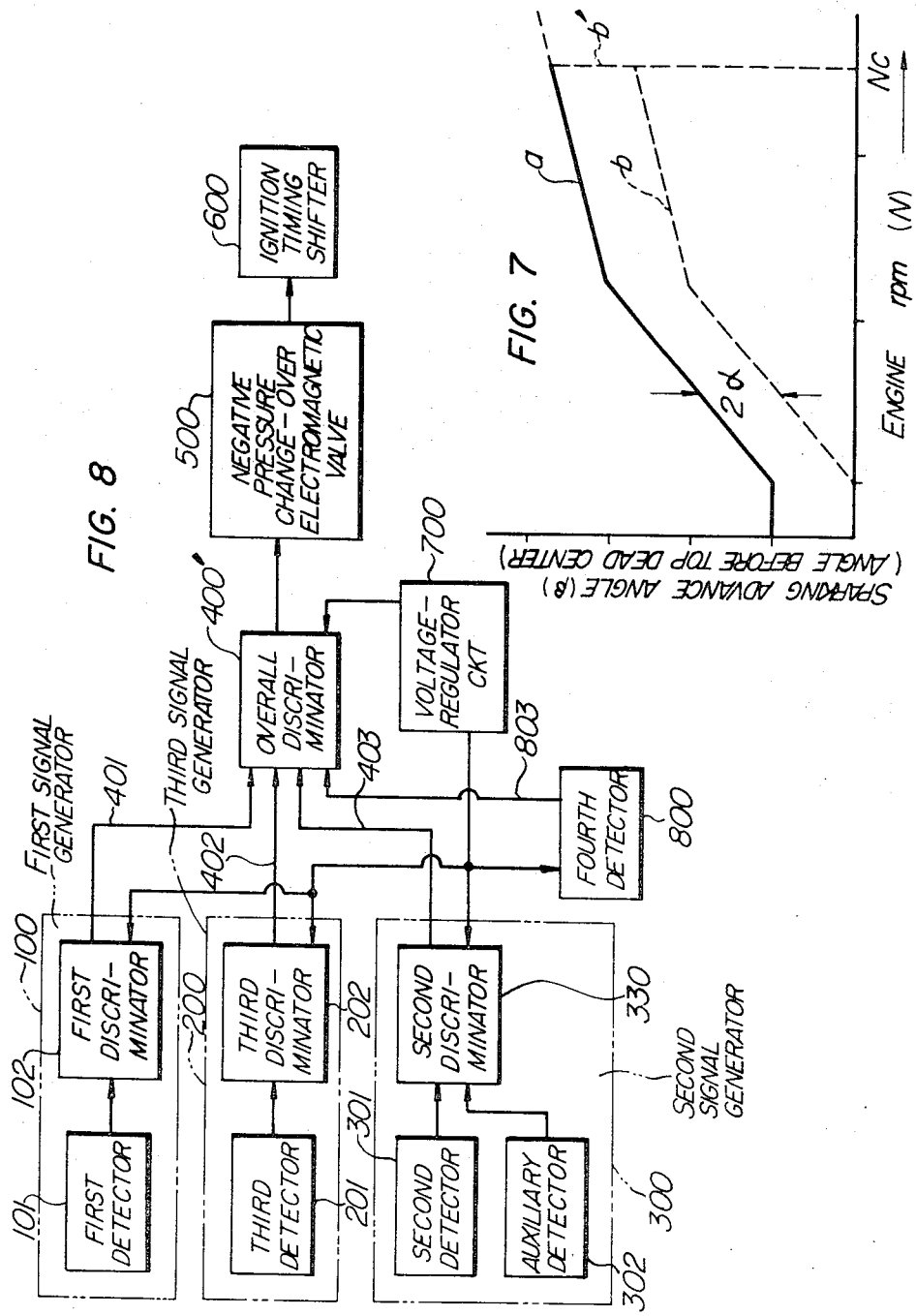

IGNITION TIMING REGULATING DEVICE FOR INTERNAL COMBUSTION ENGINES

This invention relates to ignition timing regulating devices for internal combustion engines on vehicles to provide for regulation of the ignition timing when the engine is under special operating conditions, particularly when accelerating the engine and when the engine load is high.

The regulation of the spark timing in the operation of internal combustion engines has heretofore been carried out only for the purpose of realizing maximum output and minimum fuel consumption under the normal steady engine-operating conditions, that is, solely from the standpoint of the engine characteristics and an economical operation thereof. However, the engine operation has proved to have various problems in some respects other than the engine characteristics and the economical operation thereof under special conditions such as when the engine is accelerated or the engine load suddenly increases. By way of example, the present-day air polution by exhaust gases discharged from automobile engines into the atmosphere is an important public problem in respect of the environmental sanitation. The exhaust gases discharged from decelerating engines contain a great amount of hydrocarbons. Though the content of oxides of nitrogen in the exhaust gases are low when the engine is operated under low load conditions, it becomes extremely high under such conditions as accelerating the engine with an increase in the engine load to such an extent that the exhaust gases become harmful to the human body, thus constituting a significant problem.

Accordingly, a first object of the invention is to solve the above problems by the provision of an ignition timing regulating device for internal combustion engines, which comprises a first detector to detect the engine speed or vehicle speed so as to produce a corresponding electric signal, a second detector to detect the engine load so as to produce a corresponding electric signal, and an ignition timing shifting means to shift the spark timing when both the outputs from the first and second detectors have reached their respective preset values, thereby positively varying the spark timing under special engine-operating conditions so as to prevent increased amounts of oxides of nitrogen and other harmful compounds from being exhausted under special engine-operating conditions.

According to the first aspect of the invention, there are featured excellent effects in that, as a logical operation circuit to receive the output signals from the first and second discriminators so as to produce a single electric output signal is provided, overall discrimination or decision on the output signals from the first and second discriminators may be stably and reliably made by the logical operation circuit in terms of voltage levels or codes of 1 and 0, thus avoiding malfunctioning due to an erroneous overall decision on the output signals from the discriminators, and that by adopting an integrated circuit for the logical operation circuit, the circuit construction may be simplified, thus reducing the number of welding spots to improve reliability and durability, as well as by reducing the size of the device, facilitating the mass production for cost reduction and providing for exact response characteristic of the circuit. Further excellent effects featured are that as the ignition timing shifting means to shift the spark timing in accordance with the output signal from the logical operation circuit is provided, the spark timing may be properly shifted under special engine-operating conditions such as when the engine is being accelerated and when the engine load is increased with almost no sacrifice of the engine's output characteristics, thus preventing increased amounts of oxides of nitrogen from being produced and added to the exhaust gases discharged from the engine under special operating conditions, particularly when the engine is being accelerated and under a high load condition.

A second object of the invention is to provide an ignition timing regulating device for internal combustion engines, which comprises, in addition to the first and second detectors as aforementioned in connection with the first object of the invention, a third detector to detect the temperature condition of the engine being warmed up so as to produce a corresponding electric signal, and an ignition timing shifting means to shift the spark timing when all the outputs from the first, second and third detectors have reached respective preset values, thereby avoiding the regulating of the spark timing according to the first aspect of the invention when the engine is under such temperature conditions that it tends to impede the engine output characteristics and the stability of the engine, and at the same time the production of oxides of nitrogen is less, even under special engine-operating conditions, thus particularly attaching importance to the engine characteristics with respect to the engine temperature conditions, as well as otherwise achieving the same features as according to the first aspect of the invention.

According to the second aspect of the invention, additional excellent effects can be featured, that as there are provided the third detector to detect the temperature condition of the engine being warmed up so as to generate an electric signal and an associated third discriminator to compare the output from the third detector with a preset value so as to produce a corresponding output signal, whether the engine is sufficiently warmed up or not may be detected by the third detector and the third discriminator, so as to avoid the regulation of the spark timing in case the engine is under such temperature conditions that the spark timing regulation would tend to impede the engine characteristics and at the same time the production of oxides of nitrogen is less, even when the engine is under special operating conditions, and operate the engine according to the normal ignition characteristic and without impeding the engine characteristics, as well as featuring the effects according to the first aspect of the invention.

A third object of the invention is to provide an ignition timing regulating device for internal combustion engines, which comprises a first detector to detect the engine speed or vehicle speed so as to produce a corresponding electric signal, a second detector to detect the engine load so as to produce a corresponding electric signal, a third detector to detect the temperature condition so as to produce a corresponding electric signal, a fourth detector to detect the gear position of the transmission on the vehicle carrying the engine so as to produce a corresponding electric signal, and an ignition timing shifting means to shift the spark timing when all the outputs from the first, second, third and fourth detectors have reached respective preset values, thereby regulating the spark timing under special engine-operating conditions, particularly when the engine is being accelerated and when the engine load is increased, so as to prevent increased amounts of oxides of nitrogen or other harmful compounds from being exhausted under special engine-operating conditions, avoiding regulation of the spark timing in case the engine is under such conditions that the spark timing regulation is likely to impede the engine characteristics and at the same time the production of oxides of nitrogen is less, even when the engine is under special operating conditions, thus meeting the requirements of the temperature characteristics of the engine for stable engine operation, and particularly shifting the spark timing only for an appropriate range of engine acceleration where the production of oxides of nitrogen tends to increase while adopting the spark timing according to the normal ignition characteristic under engine-operating conditions other than the aforementioned range so as to safeguard the engine characteristics, so that purification of the exhaust gases, and particularly the prevention of the production of oxides of nitrogen, without appreciably impeding the engine characteristics may be attained.

Other objects, features and advantages of the invention will become apparent from the following description taken in conjunction with the accompanying drawings, in which:

FIG. 3 is a circuit diagram of an example of the constant voltage circuit in the embodiment of FIG. 1;

FIG. 4 is a schematic view, partly in diagram form, of the ignition timing shifting means in the embodiment of FIG. 1;

FIG. 5a is an axial sectional view of a negative pressure change-over electromagnetic valve in the ignition timing shifting means of FIG. 4;

FIG. 5b is a fragmentary radial section of the negative pressure change-over electromagnetic valve of FIG. 5a;

FIG. 6 is a transverse sectional view of a second example of the ignition timing shifting means in the embodiment of FIG. 1;

FIG. 7 is a graph showing spark advance angle against engine speed for the ignition timing shifting means of FIG. 6;

FIG. 8 is a block diagram of a second embodiment of the ignition timing regulating device for internal combustion engines according to the invention.

Figure 1:
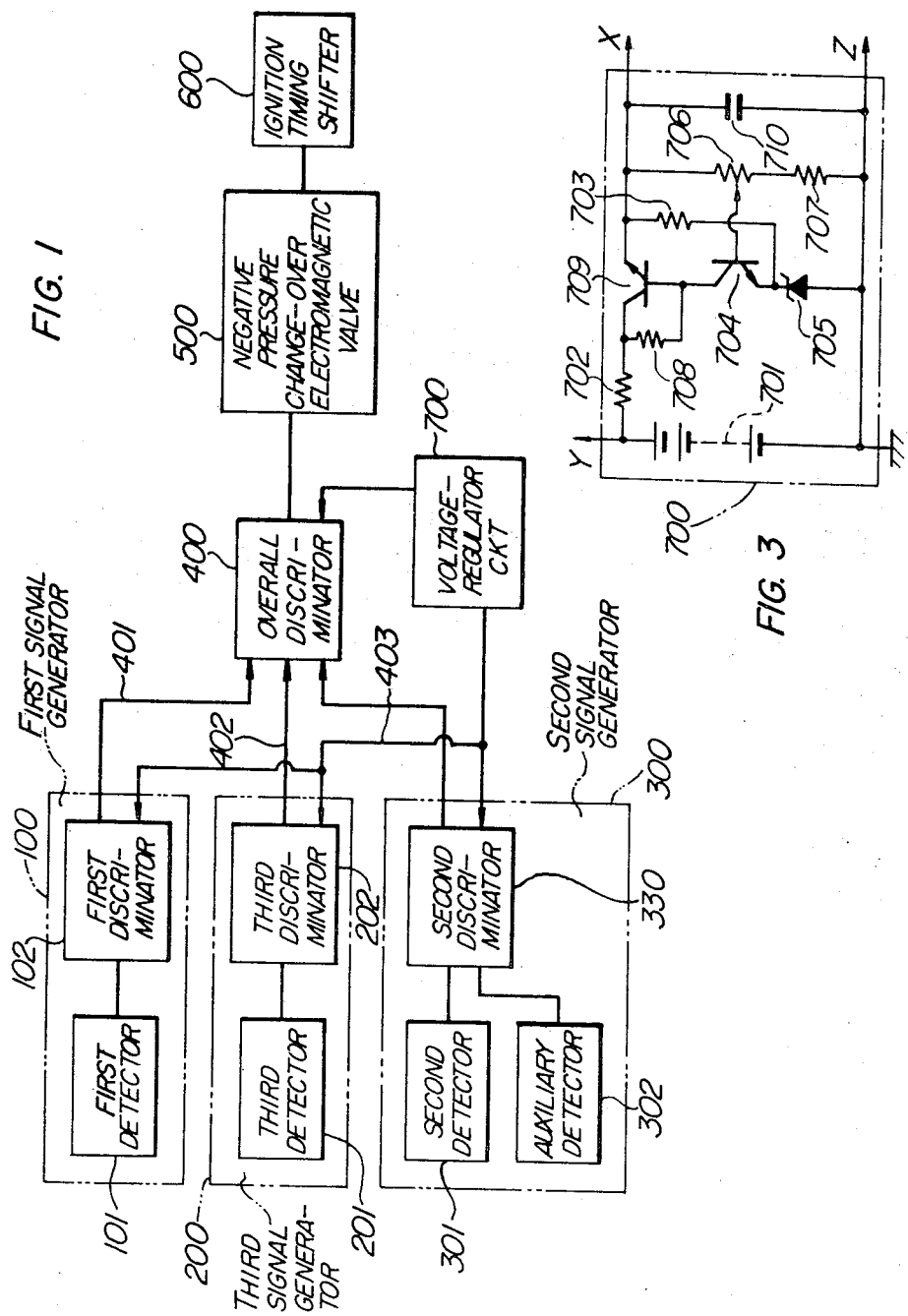
FIG. 1 is a block diagram of a preferred embodiment of the ignition timing regulating device for internal combustion engines according to the invention.

Referring now to FIG. 1, which outlines the circuit construction of a first embodiment of the invention, numeral 101 designates a first detector to generate an electric signal corresponding to the engine speed. Numeral 102 designates a first discriminator to generate an electric output signal by discriminating whether the output signal from the first detector 101 has reached a predetermined value, that is, discriminating whether the engine is satisfying one of the conditions for shifting the spark timing from the intelligence of the output of the detector 101. The first discriminator 102 has a hysteresis characteristic so that its output signal once it appears when the preset value is reached will not disappear with a slight change in various conditions, which is very convenient to obtain a stable characteristic against variation of the source voltage, noise signal and fluctuation of the output from the first detector 101. It also has a similar hysteresis characteristic after the output signal once disappears when the output from the first detector 101 gets below the preset value. The first detector 101 and the first discriminator 102 constitute a first signal generator 100, whose output is impressed on an overall discriminator 400 (to be described hereinafter in detail). The preset value is particularly selected to, for instance, 3,000 rpm when the vehicle is travelling city streets, so as to conform to the engine speed corresponding to low vehicle speeds, because when travelling the streets at a relatively low vehicle speed, the oxides of nitrogen contained in the engine exhaust gas gives rise to public health problems.

Numeral 201 designates a third detector to detect, for instance, the temperature of the cooling water in the engine. Numeral 202 designates a third discriminator operating entirely in the same manner as the first discriminator 102, so generating an electric output signal by discriminating whether the output signal from the third detector 201 has reached a preset value, that is, discriminating whether the engine has been sufficiently warmed up. The third detector 201 and the third discriminator 202 constitute a third signal generator 200, whose output is also impressed on the overall discriminator 400.

Numeral 301 designates a second detector to detect the engine load, which is an engine-operating condition in a narrow sense, in terms of negative pressure in the intake manifold of the engine. The output signal from the second detector 301 is fed to a second discriminator 330, which also operates in the same manner as the first discriminator 102, generating an electric output signal by discriminating whether the output from the second detector 301 has reached a preset value. The second detector 301 has a circuit to limit its output only for a constant interval of time. In case a condition requiring the regulating operation to be stopped is suddenly set up during the aforementioned constant time interval, for instance a condition brought about as a result of applying the engine brake by closing the throttle valve of the engine, whereby the negative pressure is extremely increased and at the same time the combustion rate is reduced to reduce the production of the oxides of nitrogen, such condition is detected by an auxiliary detector 302 so as to stop the regulating operation during the constant operating period. The second detector 301, auxiliary detector 302 and second discriminator 330 constitute a second signal generator 300, whose output is also impressed on the overall discriminator 400.

The overall discriminator 400 discriminates whether all the output signals from the first, second and third signal generators 100, 300 and 200 are present. When all the output signals are present, the overall discriminator 400 produces an output signal to energize an electromagnetic coil of a negative pressure changeover electromagnetic valve 500 controlling an ignition timing shifter 600. The first, second and third signal generators 100, 300 and 200 receive a constant voltage from a constant voltage supply circuit 700.

The first, second and third signal generators 100, 300 and 200 will now be described in further detail.

Figure 2:
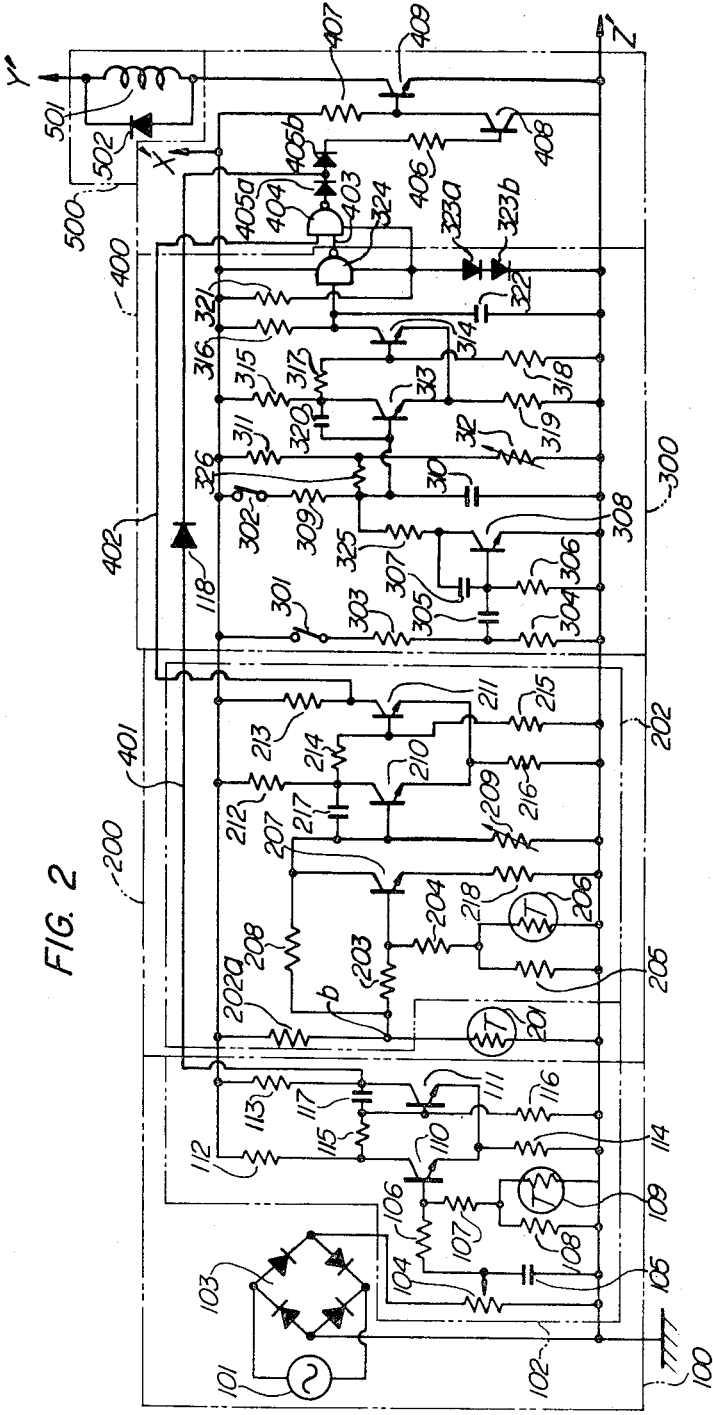
FIG. 2 is a circuit diagram showing in detail the electric control part of the embodiment of FIG. 1.

Referring to FIG. 2, the first signal generator 100 comprises a generator 101, constituting the first detector, to detect the engine speed, which is, for instance, coupled to the engine output shaft, a bridge type shaper 103, a voltage-dividing variable resistor 104, a smoothing capacitor 105, an ambient temperature compensating circuit including resistors 107 and 108 and a thermistor 109, a Schmitt circuit including transistors 110 and 111, load resistors 112 and 113 for the respective transistors 110 and 111, a common-emitter resistor 114, a coupling resistor 115, a Schmitt level determination resistor 116 and a noise prevention capacitor 117.

The third signal generator 200 comprises a temperature detecting thermistor 201, constituting the third detector, which is immersed in the engine cooling water, a current detection resistor 202a to detect current through the thermistor 201, an input base resistor 203 for a transistor 207, a variable resistor 204, a resistor 205, a thermistor 206, the parts 204 to 206 constituting a temperature compensating circuit and a first preset value detection circuit and the transistor 207 serving to determine the first preset value, an input resistor 208, a second preset value determination variable resistor 209, transistors 210 and 211 constituting a Schmitt circuit, load resistors 212 and 213 for the respective transistors 210 and 211, a coupling resistor 214, a Schmitt level determination resistor 215, a common emitter resistor 216, a noise prevention capacitor 217, and an emitter resistor 207 for the transistor 218.

The second signal generator 300 comprises a second discriminator 330, a switch 301, constituting the second detector, which is operated (opened and closed) by the negative pressure in the engine intake manifold, a switch 302, constituting the auxiliary detector, which is similarly operated (opened and closed) by the engine intake manifold negative pressure, a charging path resistor 303, a discharging path resistor 304, a discharging path capacitor 305, a bias resistor 306, a noise prevention capacitor 307, a discharging path transistor 308, a discharging path resistor 325, a resetting discharging path resistor 309, a charging capacitor 310, a voltage-dividing circuit including a resistor 311 and a variable resistor 312, a charging path resistor 326, transistors 313 and 314 constituting a Schmitt circuit, load resistors 315 and 316 for the respective transistors 313 and 314, a coupling resistor 317, a Schmitt level determination resistor 318, a common-emitter resistor 319, noise prevention capacitors 320 and 322, an input level compensating circuit including a resistor 321 and diodes 323a and 323b, and an AND-NOT circuit 324 for polarity inversion (hereinafter termed a NAND circuit), which is an integrated circuit.

Numeral 401 designates an output line from the first signal generator 100, numeral 402 designates an output line from the third signal generator 200, and numeral 403 designates an output line from the second signal generator 300.

The overall discriminator 400 comprises a NAND circuit 404, which is an integrated circuit, level correction diodes 405a and 405b, an input resistor 406, a load resistor 407, an amplifying transistor 408, and an electromagnetic coil energization transistor 409. The collector of the transistor 409 is connected to an electromagnetic coil 501 of the negative pressure change-over electromagnetic valve 500, which is described hereinafter in detail, and a reverse voltage absorption diode 502 is connected in parallel with the electromagnetic coil 501. The output lines 403 and 402 from the respective second and third signal generators 300 and 200 are connected to the input side of the NAND circuit 404, and the output line 401 from the first signal generator 100 is connected through a reverse current blocking diode 118 to the connection between the diodes 405a and 405b.

Figure 9:
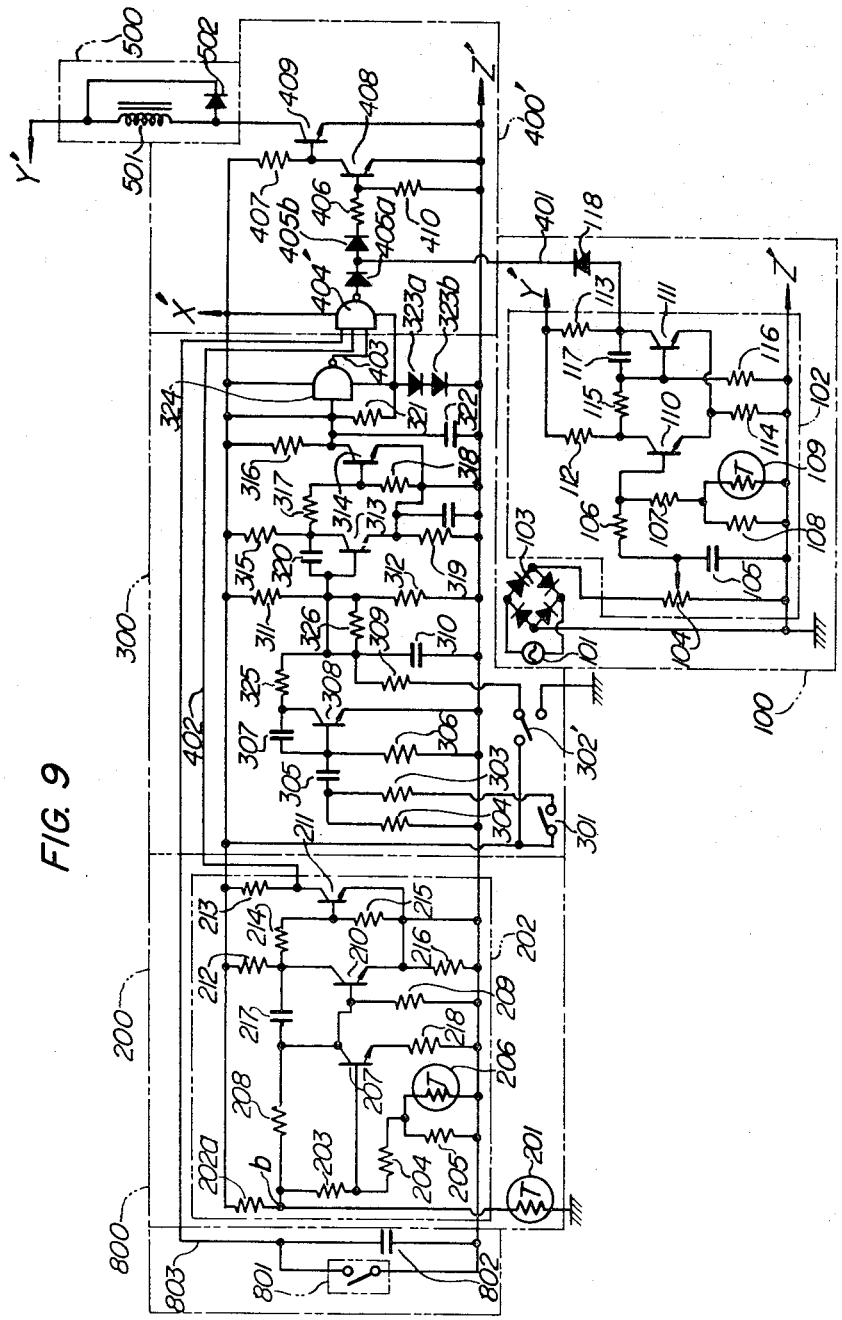
FIG. 9 is a circuit diagram showing in detail the electric control part of the embodiment of FIG. 8.

The constant voltage supply circuit 700 is of a construction as shown in FIG. 3. It comprises a battery source 701, an input current limiting resistor 702, a constant voltage resistor 703, a first-stage transistor 704, a Zener diode 705, a variable resistor 706, a resistor 707 connected in series with the variable resistor 706, a bias resistor 708, a second-stage transistor 709 to provide a constant voltage output, and a smoothing capacitor 710. The smoothing capacitor 710 is connected at an end indicated by X to a source bus line X′, and the positive pole Y and the negative pole Z are respectively connected to an end Y′ of the electromagnetic coil 501 of the negative pressure change-over electromagnetic valve 500 and to a return line Z′, as shown in FIG. 2 and also in FIG. 9 illustrating a second embodiment. In the operation of the constant voltage supply circuit 700 of the above construction, if the transistor 709 is triggered owing to change in bias voltage across the bias resistor 708, the potential difference across the capacitor 710 starts to increase. Subsequently, as soon as the base potential on the transistor 704 exceeds the Zener voltage of the Zener diode 705, the transistor 704 becomes conductive to lower the base potential of the transistor 709, thus eventually cutting off the transistor 709 so as to decrease the terminal voltage across the capacitor 710. Thus, the terminal voltage across the capacitor 710 is made constant.

The negative pressure change-over electromagnetic valve 500 is of a construction as shown in FIGS. 5a and 5b. Referring to FIGS. 5a and 5b, the electromagnetic coil 501 is wound in the hollow cylindrical form and enclosed in a cylindrical outer shell 503 made of a magnetic material. Through the electromagnetic coil 501 extends a stationary iron core 504 secured at one end to an end lid 505. The stationary iron core 504 is formed with an inner axial passage 506 communicating via a pipe 507 with the atmosphere. Disposed within the outer shell 503 and adjacent the electromagnetic coil 501 is a cylindrical yoke 508 forming part of the magnetic circuit of the coil 501. The yoke 508 surrounds a movable iron core 509 extending and movable along the same axis of the stationary iron core 504. The movable iron core 509 is formed with outer axial grooves or slots 510a and 510b and an axial stepped opening 511, as shown clearly in FIG. 5b. A spring 512 is interposed between a shoulder 513 of the stepped hole 511 and the opposing end of the stationary iron core 504. A valve shaft 514 is fitted into the stepped hole 511 and has both ends covered with respective valve members 515 and 516 of a flexible material. The valve member 516 facing the inner end of the passage 506 in the stationary iron core 504 is driven to open and close the passage 506. To an end lid 517 on the side of the outer shell 503 opposite the end lid 505 is secured a partition wall member 518 defining sections 519, 520 and 521 within the outer shell 503. The sections 519 and 521 are always in communication with each other. The wall member 518 is formed with a section or passage 522 communicating at one end with the section 520 and at the other end via a pipe 523 with a negative pressure chamber 603 of the ignition timing shifter 600 to be described hereinafter in detail, as shown in FIG. 4. The section 521 communicates with the suction pipe of the engine via a pipe 524. The wall member 518 is also formed with a central hole 525 facing the valve member 515 and is opened and closed by the valve member 515. Leads 526 of the electromagnetic coil 501 are taken out of the end lid 517 through a sealing member 527. In operation, when the electromagnetic coil 501 is not energized, the movable iron rod 509 together with the valve shaft 514 is urged against the wall member 518 by the spring force of the spring 512, so that the central hole 525 is closed by the valve member 515, thus isolating the section 519 from the section 520 while communicating the section 520 with the passage 506 via the grooves 510a and 510b in the movable iron core 509. When the electromagnetic coil 501 is energized, the electromagnetic coil 501 attracts the movable iron core 509 together with the valve shaft 514 by the magnetic force of attraction against the spring force of the spring 512. As a result, the valve member 515 is detached from the wall member 518 to open the central hole 525, while the valve member 516 closes the passage 506, thus communicating the section 520 with the section 519 via the central hole 525 while isolating the passage 506 from the sections 520 and 522.

The ignition timing shifter 600 in the first embodiment is shown in FIG. 4. Referring to FIG. 4, there is shown a casing 601, whose inside space is divided by a diaphragm 602 into a negative pressure compartment 603 and an atmospheric pressure compartment 604. The negative pressure compartment 603 communicates with the pipe 523 leading to the negative pressure change-over electromagnetic valve 500, as is mentioned earlier, so that the atmospheric pressure may be introduced at any time. The diaphragm 602 is connected to a diaphragm rod 611 extending through the atmospheric compartment 604 and linked to a breaker plate 607, which is housed in a distributor casing 605 and rotates with a breaker cam 606. An interrupter 608 operated by the breaker cam 606 is attached to the breaker plate 607. A rocking arm 609 is connected to a spark coil 800 and to a capacitor 610. The spark coil 800 is connected to a battery source 900.

Referring again to FIG. 2, to the operation of the first signal generator 100, the capacitor 105 is charged by the voltage generated by the generator 101. When the terminal voltage across the capacitor 105 is below a preset value, the transistor 110 is off and the transistor 111 carries current. As soon as the terminal voltage across the capacitor 105 exceeds the preset value, the transistor 110 is triggered to cut off the transistor 111, thus causing output signal 1 to appear on the output line 401. As the Schmitt circuit consisting of the transistors 110 and 111 has a hysteresis characteristic, even if the voltage level of the voltage generated by the generator 101 has returned to the same level as that, at which the transistor 110 is triggered, the transistors 110 and 111 will not be inverted, that is the transistor 110 is not cut off and the transistor 111 is not triggered, unless the voltage gets down to a slightly lower level. By virtue of this characteristic, stable operation can be ensured against noise signal superimposed upon the output voltage (signal) from the generator 101 and slight fluctuations of the source voltage. The inversion of the transistor 111 is absolutely opposite to that of the transistor 110.

In the operation of the third signal generator 200, when the temperature of the cooling water in the engine is increased, the resistance of the thermister 201 decreases to decrease the voltage on the connection point between the thermistor 201 and the resistor 202a. From its relation with the bias voltage the transistor 207 is cut off as soon as the varying resistance of the thermistor 201 exceeds a first preset value corresponding to a predetermined temperature of the cooling water. At this time, the preceding-stage transistor 210 is triggered from its predetermined bias relation. Thus, when the thermistor resistance is below the first predetermined value, the transistor 207 carries current and hence the transistor 210 is off, so that the transistor 211 is "on", and output signal 0 is present on the output line 402. As soon as the first preset value is reached, as the temperature increases, the transistor 210 is first inverted into conduction, followed by the inversion of the transistors 207 and 211 into non-conduction, thus causing output signal 1 indicating that the first preset value is exceeded to appear on the output line 402. Thus, the presence of output signal 1 on the output line 402 means that the engine has already been sufficiently warmed up. With further increase in temperature of the cooling water in the engine to further reduce the resistance of the thermistor 201, the voltage drop across the resistor 202a increases to such an extent that the transistor 210 is eventually cut off. This extent corresponds to a second preset value, and the inversion of the transistor 210 at this time is also followed by the inversion of the transistor 211 into conduction, thus causing output signal 0 indicating that the second preset value is exceeded to appear on the output line 402. In this case, also the hysteresis characteristic enables ensuring a stable output characteristic. The presence of the signal 0 on the output line 402 means that the engine is already superheated.

In the operation of the second signal generator 300, when the negative pressure in the suction pipe of the engine reaches a preset value, the switch 301 is closed to charge the capacitor 305 through the resistors 303 and 306 for a relatively short period of time. As a result, the transistor 308, which has been off with its base-emitter junction biased with a voltage across the resistor 306, is triggered, whereupon charge previously accumulated on the capacitor 310 is rapidly discharged through the resistor 325 and the collector-emitter path of the transistor 308, thus decreasing the base potential on the transistor 313 to cause the inversion of the transistor 313 from the initial "on" state into the "off" state. At the same time, the transistor 314 is inverted from the "off" state into the "on" state, and the inverted signal is further inverted through the NAND circuit 324, thus causing output signal 1 to appear on the output line 403. In course of time, the transistor 308 returns to the "off" state, thereupon charging the capacitor 310 through the resistors 311 and 326 to increase the base potential on the transistor 313 so as to cause eventual re-inversion of the transistor 313 into the "on" state and the concurrent re-inversion of the transistor 314 into the "off" state, thereby producing an inverted signal, which is inverted through the NAND circuit 324, thus causing output signal 0 to appear on the output line 403. In this manner, the output signal 1 is made to be present on the output line 403 only for a constant time interval determined by the time constant for the circuit of capacitor 310 and resistor 311 and the divided voltages across the resistor 311 and the variable resistor 312. In case the engine gets under a condition requiring to release the state established after the closure of the switch 301 during the aforementioned constant time interval, for instance a condition brought about by closing the throttle valve of the engine for applying the engine brake accompanied by a sudden increase in the negative pressure in the suction pipe of the engine, the switch 302, which is sensitive to such an increase of the negative pressure, is closed to rapidly charge the capacitor through the resistor 309 having a comparatively low resistance. As a result, the transistor 313 is triggered and the transistor 314 is cut off, thus causing output signal 0 to appear on the output line 403 to recover the state existing before the closure of the switch 301.

The output signals of the second and third signal generators 300 and 200 constitute the inputs to the NAND circuit 404. The NAND circuit 404 is arranged such that only when all the input signals are 1 it produces output signal 0, so that only when the output signal 1 is present on all the output lines 403 and 402 of the first and second signal generators 300 and 200 the NAND circuit 404 produces output signal 0, and only if both the 0 output signal from the NAND circuit 404 and the 0 output signal on the output line 401 from the first signal generator 100 appear, the transistor 408 is cut off and the transistor 409 is triggered to energize the electromagnetic coil 501 of the negative pressure change-over electromagnetic valve 500. Thus, the electromagnetic coil 501 of the negative pressure change-over electromagnetic valve 500 is energized, only when the content of the oxides of nitrogen in the exhaust gases are extremely high after the engine has been warmed up, the engine load is high and the engine speed is below a preset value.

The operation after the energization of the electromagnetic coil 501 is now described with reference to FIGS. 4 and 5. The electromagnetic force of attraction produced by energizing the electromagnetic coil 501 pulls the movable iron core 509 together with the valve shaft 514 against the spring force of the spring 512, opening the central hole 525 and closing the passage 506 with the valve member 516 to render the pipe 524 into communication with the pipe 523 via the sections 521 and 519, the hole 525 and the section 520 so as to introduce the negative pressure of the engine suction pipe into the negative pressure compartment 603 of the ignition timing shifter 600, thereby pulling the diaphragm 602 toward the side of the negative pressure compartment 603. The displacement of the diaphragm 603 thus brought about is transmitted through the diaphragm rod 611 to the breaker plate 607 to rotate the plate 607 by a corresponding amount in the same direction as the breaker cam 606 so as to shift the position of the cam 606 relative to the interrupter 608, thus retarding the spark timing. The retardation of the spark timing decreases the combustion efficiency of the engine, so that the temperature in the cylinder assumes such a value as to hardly permit the production of oxides of nitrogen, thus preventing them from being released into the atmosphere.

As the output signal 1 of the second signal generator 300 is present only for a constant time interval, the retardation of the spark timing is maintained only for that constant time and after that time the normal ignition timing characteristic is recovered. Also, even during the above constant time period, if the switch 302 of the second signal generator 300 is suddenly closed or if any one of the above three conditions is upset, the output signal of the overall discriminator 400 immediately disappears to de-energize the electromagnetic coil 501 so as to recover the normal ignition timing characteristic. The temperature of the engine cooling water corresponding to the first preset value for the operation of the third signal generator 200 is selected to an appropriate value, for instance 40°C, at which the engine can be regarded to be sufficiently warmed up, in order to prevent the decrease of the engine output from otherwise shifting the spark timing from the normal timing when the engine is not sufficiently warmed up. As for the second preset value, with the setting of the temperature of the cooling water to, for instance, 110°C, the output signal of the third signal generator 200 is inverted to 0 at the time the temperature of the cooling water which increases from the instant of starting the engine reaches 110°C. However, for the converse case with decreasing temperatures a slight hysteresis is required for the point of re-inverting the output signal; if the temperature for the second preset value is 110°C, the re-inverting point should be, for instance, between somewhere 90°C and 100°C. This is necessary for preventing the engine from being seized.

A second example of the ignition timing shifting means is shown in FIG. 6. In the Figure, numerals 605 to 609 designate like or equivalent parts to those shown in FIG. 4. Numeral 612 designates an interrupter particularly provided for this example. The interrupter 612 is operated by breaker cam 606 similar to interrupter 608. It is attached to breaker plate 607 such that it deviates by an angle α with respect to a line connecting interrupter 608 and the center of breaker cam 606. Upon appearance of the output signal of the overall discriminator 400 a microswitch (not shown) is actuated to switch the primary winding of the spark coil from a lead 613 connected to the interrupter 608 into a lead 614 connected to the interrupter 612. Normally, when no output signal of the overall discriminator 400 is present, the primary winding of the spark coil is connected with the lead 613. Numeral 615 designates a rocking arm having a contact of the interrupter 612. In operation, normally when the output signal of the overall discriminator 400 is not present, current passes through the interrupter 608, which provides the sparking advance angle β (before the piston reaches the top dead center) in such relation to the engine rpm (N) as shown by solid plot (a) in FIG. 7. As soon as the output signal of the overall discriminator 400 appears, the primary winding of the spark coil is switched from the interrupter 608 over to the interrupter 612 to energize the interrupter 612, which provides the sparking advance angle β lagging an angle 2α behind the normal spark advance angle, as shown by dashed plot (b) in FIG. 7. Assuming the preset value of the engine rpm to be Nc, the spark advance angle β increasing along the dashed plot (b) jumps across a dashed segment indicated at (b') to a value in the solid plot (a) at the instant the value Nc of the engine speed is reached.

In the preceding embodiment, the first signal generator 100 generates an output signal by discriminating whether the engine speed has reached a preset value, which is one of the factors for shifting the spark timing under special engine-operating conditions. Alternatively, the output signal of the first signal generator 100 may be produced through the detection of the vehicle speed, which is compared with a maximum or minimum preset value or with both the maximum and minimum preset values in a certain predetermined range where the content of the oxides of nitrogen in the exhaust gases are high. In this case, the production of oxides of nitrogen under the special engine-operating conditions may be prevented in a similar manner to having resort to the detected engine speed as in the above embodiment, and a similar circuit construction may be employed.

Also, regarding the second detector in the preceding embodiment, which is the switch 301 operated on the engine negative pressure to detect the engine load so as to generate a corresponding electric signal, other operating parameters than the negative engine pressure, for instance, the position of the accelerator pedal, throttle position and revolution ratio between the input and output shafts of the torque converter, may be utilized to derive the electric signal.

Further, the third detector to detect the temperature of the engine being warmed up is not limited to the thermistor 201 immersed in the engine cooling water as in the above embodiment, but use may be made of other so-called heat-sensitive elements such as a Posistor (positive thermistor) a Critesistor (critical thermistor), etc., which may be directly attached to or embedded in the cylinder block or cylinder head or immersed in the engine oil, and from which the electric signal representing the temperature condition of the engine may be derived.

Furthermore, the ignition timing shifting means in the above embodiment may be replaced with such means as an electromagnetically operated link mechanism.

A second embodiment of the ignition timing regulating device for internal combustion engines according to the invention is outlined in block form in FIG. 8 and shown for its electric control circuitry in detail in the circuit diagram of FIG. 9.

This embodiment differs from the preceding embodiment of FIGS. 1 and 2 in that in this embodiment a fourth detector 800 is additionally provided. The fourth detector 800 serves to detect the highest speed gear position, for instance the fourth (top) gear position in case that the engine is coupled to a four-forward-position transmission. Because of the fact that the gears other than the highest speed gear are mostly coupled for acceleration, non-detection of the highest speed gear position means that the vehicle is under an accelerating condition. Thus, the fourth detector 800 may be regarded to detect the accelerating condition of the vehicle or engine.

An overall discriminator 400' discriminates whether all the output signals from first, second, third and fourth signal generators 100, 300, 200 and 400 are present. When all the output signals becomes present, the overall discriminator 400' produces an output signal to energize an electromagnetic coil of negative pressure change-over electromagnetic valve 500 controlling the ignition timing shifter 600.

Referring to FIG. 9, the fourth detector 800 comprises a microswitch 801, which is closed when the transmission is placed in the final gear position, and a noise prevention capacitor 802. Numeral 803 designates an output line from the fourth detector 800. Numerals 401, 402 and 403 designate respective output lines from the first, third and second signal shifter 100, 200 and 300.

The overall discriminator 400' comprises a NAND circuit 404', which is an integrated circuit, level correction diodes 405a and 405b, input voltage-dividing resistors 406 and 410, a load resistor 407, an amplifying transistor 408, and a transistor 409 for energizing the electromagnetic coil 501 of the negative pressure change-over electromagnetic valve 500. The electromagnetic coil 501 is connected to the collector of the transistor 409, and across the coil 501 is connected a parallel reverse-voltage absorbing diode 502. The output line 403 from the second signal generator 300, the output line 402 from the third signal generator 200 and the output line 803 from the fourth detector 800 are connected to respective input terminals of the NAND circuit 404', and the output line 401 from the first signal generator 100 is connected through reverse-current blocking diode 118 to the connection between the diodes 405a and 405b.

When the transmission is shifted into the final gear position, the microswitch 801 of the fourth detector 800 is actuated to cause output signal 1 to appear on the output line 803, and when the transmission is in other gear positions, output signal 0 is present on the output line 803.

As is mentioned, the output signals of the second, third and fourth signal generators 300, 200 and 800 each constitute an input to the NAND circuit 404', and the NAND circuit 404' is arranged such that only when all the input signals are 1 it produces output signal 0, so that only when the output signal 1 is present on all the output lines 403, 402 and 803 of the respective second, third and fourth signal generators 300, 200 and 800 the output signal of the NAND circuit 404' becomes 0, and only when both the output signal of the NAND circuit 404', and the output signal on the output line 401 from the first signal generator 100 becomes 0, the transistor 408 is cut off and the transistor 409 is triggered, thus energizing the electromagnetic coil 501 of the negative pressure change-over electromagnetic valve 500. Thus, the electromagnetic coil 501 of the negative pressure change-over electromagnetic valve 500 is energized, only when the four conditions hold concurrently, that the exhaust gases contain a great amount of oxides of nitrogen produced by the engine and to be discharged into the atmosphere after the engine has been warmed up, that the engine load is high, that the engine and hence the vehicle is being accelerated, and that the engine speed is below a preset value. Although in the embodiment of FIG. 1 the first detector and the first discriminator are used to produce an electric signal corresponding to the engine speed or vehicle speed, they may be replaced with a fourth detector to produce an electric signal corresponding to the position of the transmission. As is discussed earier, the condition that the engine is being warmed up is detected by the third signal generator 200, the high engine load condition is detected by the second signal generator 300, the condition that the engine, and hence the vehicle, is being accelerated is detected by the fourth detector 800, and the condition that the engine speed is below a preset value is detected by the first signal generator 100. The operation after the energization of the electromagnetic coil 501 of the negative pressure changeover electromagnetic valve 500 is the same as is discussed earier in connection with FIGS. 4, 5a and 5b except for that the overall discriminator 400' receives four conditional inputs.

The aforementioned four conditions will now be discussed individually. That the engine speed is below a preset value, for instance 3,000 rpm, is made the first condition, in order to prevent the oxides of nitrogen from being discharged into the atmosphere when the vehicle is travelling along city streets at a comparatively low average speed, because it is when the vehicle is running in such streets at a low speed that the oxides of nitrogen contained in the exhaust gases are discharged into the atmosphere and give rise to the problem of air pollution. That the engine load is high is made the second condition, because with a high engine load the engine generates increased heat to raise the engine temperature so that the oxides of nitrogen tend to be readily produced. That the engine is being warmed up is made the third condition, because during the period of warming-up after the start of the engine the temperature of the engine itself and the combustion efficiency are low, hardly causing the production of the oxides of nitrogen, while the piston-cylinder frictional resistance is high due to the high viscosity of the engine oil and combustion is unstable, so during this period it is preferable to provide the normal ignition timing characteristic to make the engine characteristics stable.

Although the foregoing description is concerned with the vehicle provided with a manual transmission, with the vehicle provided with an automatic transmission it is possible to utilize hydraulic pressure for the gear-shifting to detect the gear position of the transmission.

Also, in case engine temperature is increased due to hard engine-operating conditions, the increased temperature may be detected by means of, for instance, the output signal of the third signal generator 200 to reduce the heat load by re-switching the shifted ignition timing.

In the above embodiment, the first signal generator 100 generates output signal by discriminating whether the engine speed has reached a preset value, for instance 3,000 rpm. Alternatively, the first signal generator 100 may generate an output signal by discriminating whether the vehicle speed has reached a preset value, whereby a similar operation to the above case of detecting the engine speed may be achieved with a substantially similar circuit construction. For the first signal generator 100 based on the detection of the engine speed, the means to detect the engine speed may make use of the primary current through the distributor or it may utilize the combination of the flywheel gear and the electromagnetic pick-up. For the first signal generator based on the detection of the vehicle speed, the means to detect the vehicle speed may utilize the transmission output shaft, wheel shaft, tachometer drive shaft and so forth for driving such means as an AC generator, DC generator or pulse generator, or it may directly detect the position of the tachometer pointer.

The engine load detection means for the second signal generator 300 may be a resistance wire strain gauge or a semiconductor strain gauge to detect the negative pressure in the engine suction pipe, or it may detect the position of the accelerator pedal.

The engine temperature condition detection means for the third signal generator 200 may use such heat sensitive means as a thermistor, a Posistor and a bimetal to detect the temperature of engine oil, cylinder block of the engine and so forth.

The engine accelerating condition detection means for the fourth signal generator 400 may detect the rotation ratio between the input and output shafts of transmission and torque converter, the position of the shift lever and so forth.

What is claimed is:

1. An ignition timing regulating device for reducing nitrogen oxides in the exhaust of internal combustion engines for vehicles having transmissions comprising:

a plurality of detecting means for individually detecting the engine speed, engine load, engine temperature, and transmission gear position so as to produce respective signals corresponding to engine speed, load and temperature and gear position;

a plurality of discriminating means individually comparing the respective signals from said detecting means with preset reference values and including:

a. engine speed comparator means connected in circuit with said speed detecting means for generating an output signal when the signal from said speed detecting means falls below a first preset voltage and for terminating generation of its own said output signal only when the signal from said speed detecting means becomes greater than a second preset voltage which is greater than said first preset voltage, b. load comparator means connected in circuit with said load detecting means for generating an output signal when the detected load becomes greater than a first preset value and for terminating generation of its own said output signal only when the load becomes smaller than a second preset value which is smaller than said first preset value, c. engine temperature comparator means connected in circuit with said engine temperature detecting means for generating an output signal when the signal from said engine temperature detector falls below a first preset voltage and for terminating generation of its own said output signal when the signal from said engine temperature detecting means exceeds a second present voltage which is smaller than the first preset voltage, said engine temperature comparator means generating an output signal again only when the signal from said engine temperature detector exceeds a third preset voltage which is greater than the second preset voltage and is still smaller than the first preset voltage, d. gear position comparator means connected in circuit with said gear position detecting means for generating an output signal when the gear position signal from said gear position detecting means represents a low gear position, an overall discriminating means receiving the output signals from said plurality of discriminating means so as to produce a single ignition timing shifting signal only when all of the said output signals from all of said comparator means are concurrently received an ignition timing shifting means in circuit with said overall discriminating means for retarding ignition timing by a predetermined amount upon receipt of said shifting to shift and spark timing in accordance with the output] signal from said overall discriminating means.

2. The ignition timing regulating device according to claim 1, wherein said discriminating means each include a Schmitt circuit.

3. The ignition timing regulating device according to claim 1, wherein said ignition timing shifting means includes a diaphragm operating with change in the difference between the engine intake negative pressure and the atmospheric pressure, a negative pressure change-over electromagnetic valve to switch the engine intake negative pressure and the atmospheric pressure in accordance with said ignition timing shifting signal, and an ignition distributor, in which the spark timing is shifted by the action of said diaphragm.

4. An ignition timing regulating device for reducing nitrogen oxides in the exhaust of internal combustion engines for vehicles having transmissions, comprising:

a plurality of detecting means for individually detecting engine load, engine temperature, vehicle speed and transmission gear position so as to produce respective signals corresponding to engine load and temperature, vehicle speed and gear position;

a plurality of discriminating means individually comparing the respective signals from said detecting means with preset reference values and including:

a. load comparator means connected in circuit with said load detecting means for generating an output signal when detected load becomes greater than a first preset value and for terminating generation of its own said output signal only when the load becomes smaller than a second preset value which is smaller than said first preset value, b. engine temperature comparator means connected in circuit with said engine temperature detecting means for generating an output signal when the signal from said engine temperature detector falls below a first preset voltage and for terminating generation of its own said output signal when the signal from said engine temperature detecting means exceeds a second preset voltage which is smaller than the first preset voltage, said engine temperature comparator means generating an output signal again only when the signal from said engine temperature detector exceeds a third preset voltage which is greater than the second preset voltage and is still smaller than the first preset voltage, c. vehicle speed comparator means connected in circuit with said speed detecting means for generating an output signal when the signal from said speed detecting means falls below a first preset voltage and for terminating generation of its own said output signal only when the signal from said speed detecting means becomes greater than a second preset voltage which is greater than said first preset voltage, and d. gear position comparator means connected in circuit with said gear position detecting means for generating an output signal when the gear position signal from said gear position detecting means represents a low gear position, an overall discriminating means receiving the output signals from said plurality of discriminating means so as to produce a single ignition timing shifting signal only when all of the said output signals from all of said comparator means are concurrently received; and an ignition timing shifting means in circuit with said overall discriminating means for retarding ignition timing by a predetermined amount upon receipt of said shifting signal from said overall discriminating means.

5. An ignition timing regulating device for reducing nitrogen oxides in the exhaust of internal combustion engines for vehicles comprising:

a plurality of detecting means for individually detecting engine load, engine temperature, and vehicle speed so as to produce respective signals corresponding to engine load and temperature and vehicle speed;

a plurality of discriminating means individually comparing the respective signals from said detecting means with preset reference values and including:

a. load comparator means connected in circuit with said load detecting means for generating an output signal when the detected load becomes greater than a first preset value terminating generation of its own said output signals only when the load becomes smaller than a second preset value which is smaller than said first preset value, b. engine temperature comparator means connected in circuit with said engine temperature detecting means for generating an output signal when the signal from said engine temperature detector falls below a first preset voltage and for terminating generation of its own said output signal when the signal from said engine temperature detecting means exceeds a second preset voltage which is smaller than the first preset voltage, said engine temperature comparator means generating an output signal again only when the signal from said engine temperature detector exceeds a third preset voltage which is greater than the second preset voltage and is still smaller than the first preset voltage, and c. vehicle speed comparator means connected in circuit with said speed detecting means for generating an output signal when the signal from said speed detecting means falls below a first preset voltage and for terminating generation of its own said output signal only when the signal from said speed detecting means becomes greater than a second preset voltage which is greater than said first preset voltage, an overall discriminating means receiving the output signals from said plurality of discriminating means so as to produce a single ignition timing shifting signal only when all of said comparator means are concurrently received; and an ignition timing shifting means in circuit with said overall discriminating means for retarding ignition timing by a predetermined amount upon receipt of said shifting signal from said overall discriminating means.

6. The ignition timing regulating device according to claim 5, wherein said discriminating means each include a Schmitt circuit.

7. The ignition timing regulating device according to claim 5, wherein said ignition timing shifting means includes a diaphragm operating with change in the difference between the engine intake negative pressure and the atmospheric pressure, a negative pressure change-over electromagnetic valve to switch the engine intake negative pressure and the atmospheric pressure in accordance with said ignition timing shifting signal, and an ignition distributor, in which the spark timing is shifted by the action of said diaphragm.

8. An ignition timing regulating device for reducing nitrogen oxides from the exhaust of internal combustion engines for vehicles having transmissions, comprising:

a plurality of detecting means for individually detecting the engine load, engine temperature, and transmission gear position so as to produce respective signals corresponding to engine load and temperature and gear position;

a plurality of discriminating means individually comparing the respective signals from said detecting means with preset reference values and including a. load comparator means connected in circuit with said load detecting means for generating an output signal when the detected load becomes greater than a first preset value and for terminating generation of its own said output signal only when the load becomes smaller than a second preset value which is smaller than said first preset value, b. engine temperature comparator means connected in circuit with said engine temperature detecting means for generating an output signal when the signal from said engine temperature detector falls below a first preset voltage and for terminating generation of its own said output signal when the signal from said engine temperature detecting means exceeds a second preset voltage which is smaller than the first preset voltage, said engine temperature comparator means generating an output signal again only when the signal from said engine temperature detector exceeds a third preset voltage which is greater than the second preset voltage and is still smaller than the first preset voltage, and c. gear position comparator means connected in circuit with said gear position detecting means for generating an output signal when the gear position signal from said gear position detecting means represents a low gear position, an overall discriminating means receiving the output signals from said plurality of discriminating means so as to produce a single ignition timing shifting signal only when all of said output signals from all of said comparator means are concurrently received; and an ignition timing shifting means in circuit with said overall discriminating means for retarding ignition timing by a predetermined amount upon receipt of said shifting signal from said overall discriminating means.

9. An ignition timing regulating device for reducing nitrogen oxides in the exhaust of internal combustion engines for vehicles comprising:

a plurality of detecting means for individually detecting engine load, engine temperature, and engine r.p.m. so as to produce respective signals corresponding to engine load, temperature and r.p.m.;

a plurality of discriminating means individually comparing the respective signals from said detecting means with preset reference values and including:

a. load comparator means connected in circuit with said load detecting means for generating an output signal when the detected load becomes greater than a first preset value and for terminating generation of its own said output signal only when the load becomes smaller than a second preset value which is smaller than said first preset value, b. engine temperature comparator means connected in circuit with said engine temperature detecting means for generating an output signal when the signal from said engine temperature detector falls below a first preset voltage and for terminating generation of its own said output signal when the signal from said engine temperature detecting means exceeds a second preset voltage which is smaller than the first preset voltage, said engine temperature comparator means generating an output signal again only when the signal from said engine temperature detector exceeds a third preset voltage which is greater than the second preset voltage and is still smaller than the first preset voltage, and c. engine speed comparator means connected in circuit with said speed detecting means for generating an output signal when the signal from said speed detecting means falls below a first preset voltage and for terminating generation of its own said output signal only when the signal from said speed detecting means becomes greater than a second preset voltage which is greater than said first preset voltage, an overall discriminating means receiving the output signals from said plurality of discriminating means so as to produce a single ignition timing shifting signal only when all of said output signals from all of said comparator means are concurrently present; and an ignition timing shifting means in circuit with said overall discriminating means for retarding ignition timing by a predetermined amount upon receipt of said shifting signal from said overall discriminating means.

10. The ignition timing regulating device according to claim 9, wherein said discriminating means each include a Schmitt circuit.

11. The ignition timing regulating device according to claim 9, wherein said ignition timing shifting means includes a diaphragm operating with change in the difference between the engine intake negative pressure and the atmospheric pressure, a negative pressure change-over electromagnetic valve to switch the engine intake negative pressure and the atmospheric pressure in accordance with said ignition timing shifting signal, and an ignition distributor, in which the spark timing is shifted by the action of said diaphragm.

12. An ignition timing regulating device for reducing nitrogen oxides in the exhaust of internal combustion engines for vehicles having transmission comprising:
   a plurality of detecting means for individually detecting at least engine speed and engine load, so as to produce respective engine speed and load signals;
   a plurality of discriminating means individually comparing the respective signals from said detecting means with preset reference values and including:
      a. engine speed comparator means connected in circuit with said speed detecting means for generating an output signal when the signal from said speed detecting means falls below a first preset voltage and for terminating generation of its own said output signal only when the signal from said speed detecting means becomes greater than a second preset voltage which is greater than said first preset voltage, and
      b. load comparator means connected in circuit with said load detecting means for generating an output signal when the detected load becomes greater than a first preset value and for terminating generation of its own said output signal only when the load becomes smaller than a second preset value which is smaller than said first preset value,
   an overall discriminating means receiving the output signals from said plurality of discriminating means so as to produce a single ignition timing shifting signal only when all of said output signals from all of said comparator means are concurrently received; and
   an ignition timing shifting means in circuit with said overall discriminating means for retarding the ignition timing by a predetermined amount upon receipt of said shifting signal from said overall discriminating means.

13. An ignition timing regulating device for reducing nitrogen oxides in the exhaust of internal combustion engines for vehicles having transmission, comprising:
   a plurality of detecting means for individually detecting at least vehicle speed and engine load so as to produce respective signals corresponding vehicle speed and engine load;
   a plurality of discriminating means individually comparing the respective signals from said detecting means with preset reference values and including:
      a. vehicle speed comparator means connected in circuit with said speed detecting means for generating an output signal when the signal from said speed detecting means falls below a first preset voltage and for terminating generation of its own said output signal only when the signal from said speed detecting means becomes greater than a second preset voltage which is greater than said first preset voltage, and
      b. load comparator means connected in circuit with said load detecting means for generating an output signal when the detected load becomes greater than a first preset value and for terminating generation of its own said output signal only when the load becomes smaller than a second preset value which is smaller than said first preset value,
   an overall discriminating means receiving the output signals from said plurality of discriminating means so as to produce a single ignition timing shifting signal only when all of said output signals from all of said comparator means are concurrently received; and
   an ignition timing shifting means in circuit with said overall discriminating means for retarding ignition timing upon receipt of said shifting signal from said overall discriminating means.

14. An ignition timing regulating device for reducing nitrogen oxides in the exhaust of internal combustion engines for vehicles, comprising:
   a plurality of detecting means for individually detecting at least vehicle speed and engine temperature so as to produce respective signals corresponding to vehicle speed and engine temperature;
   a plurality of discriminating means individually comparing the respective signals from said detecting means with preset reference values and including:
      a. vehicle speed comparator means connected in circuit with said speed detecting means for generating an output signal when the signal from said speed detecting means falls below a first preset voltage and for terminating generation of its own said output signal only when the signal from said speed detecting means becomes greater than a second preset voltage which is greater than said first preset voltage, and
      b. engine temperature comparator means connected in circuit with said engine temperature detecting means for generating an output signal when the signal from said engine temperature detector falls below a first preset voltage and for terminating generation of its own said output signal when the signal from said engine temperature detecting means exceeds a second preset voltage which is smaller than the first preset voltage, said engine temperature comparator means generating an output signal again only when the signal from said engine temperature detector exceeds a third preset voltage which is greater than the second preset voltage and is still smaller than the first preset voltage, an overall discriminating means receiving the output signals from said plurality of discriminating means so as to produce a single ignition timing shifting signal only when all of said output signals from all of said comparator means are concurrently received, and an ignition timing shifting means in circuit with said overall discriminating means for retarding the ignition timing upon receipt of said shifting signal from said overall discriminating means.

15. An ignition timing device as in claim 1 wherein said load comparator means further includes means for terminating generation of an output signal of said load comparator means when a mechanical displacement detected by said load detector has become greater than a first preset value and the state is maintained for a predetermined period of time.

16. An ignition timing device as in claim 1 wherein said engine temperature comparator means further includes means for terminating generation of an output signal of said engine temperature comparator means only when the voltage signal from said engine temperature detector exceeds a fourth preset voltage which is greater than the first preset voltage.

17. An ignition timing device as in claim 4 wherein said load comparator means further includes means for terminating generation of an output signal of said load comparator means when a mechanical displacement detected by said load detector has become greater than a first preset value and the state is maintained for a predetermined period of time.

18. An ignition timing device as in claim 4 wherein said engine temperature comparator means further includes means for terminating generation of an output signal of said engine temperature comparator means only when the voltage signal from said engine temperature detector exceeds a fourth preset voltage which is greater than the first preset voltage.

19. An ignition timing device as in claim 5 wherein said load comparator means further includes means for terminating generation of an output signal of said load comparator means when a mechanical displacement detected by said load detector has become greater than a first preset value and the state is maintained for a predetermined period of time.

20. An ignition timing device as in claim 5 wherein said engine temperature comparator means further includes means for terminating generation of an output signal of said engine temperature comparator means only when the voltage signal from said engine temperature detector exceeds a fourth preset voltage which is greater than the first preset voltage.

21. An ignition timing device as in claim 8 wherein said load comparator means further includes means for terminating generation of an output signal of said load comparator means when a mechanical displacement detected by said load detector has become greater than a first preset value and the state is maintained for a predetermined period of time.

22. An ignition timing device as in claim 8 wherein said engine temperature comparator means further includes means for terminating generation of an output signal of said engine temperature comparator means only when the voltage signal from said engine temperature detector exceeds a fourth preset voltage which is greater than the first preset voltage.

23. An ignition timing device as in claim 9 wherein said load comparator means further includes means for terminating generation of an output signal of said load comparator means when a mechanical displacement detected by said load detector has become greater than a first preset value and the state is maintained for a predetermined period of time.

24. An ignition timing device as in claim 9 wherein said engine temperature comparator means further includes means for terminating generation of an output signal of said engine temperature comparator means only when the voltage signal from said engine temperature detector exceeds a fourth preset voltage which is greater than the first preset voltage.

25. An ignition timing device as in claim 12 wherein said load comparator means further includes means for terminating generation of an output signal of said load comparator means when a mechanical displacement detected by said load detector has become greater than a first preset value and the state is maintained for a predetermined period of time.

26. An ignition timing device as in claim 13 wherein said load comparator means further includes means for terminating generation of an output signal of said load comparator means when a mechanical displacement detected by said load detector has become greater than a first preset value and the state is maintained for a predetermined period of time.

27. An ignition timing device as in claim 14 wherein said engine temperature comparator means further includes means for terminating generation of an output signal of said engine temperature comparator means only when the voltage signal from said engine temperature detector exceeds a fourth preset voltage which is greater than the first preset voltage.

* * * * *